(12) United States Patent
Omiya et al.

(10) Patent No.: US 12,275,873 B2
(45) Date of Patent: Apr. 15, 2025

(54) ADHESIVE TAPE AND TAPE ROLL

(71) Applicant: TOKIN CORPORATION, Shiroishi (JP)

(72) Inventors: Tadashi Omiya, Sendai (JP); Masakazu Abe, Sendai (JP)

(73) Assignee: TOKIN CORPORATION, Shiroishi (JP)

( * ) Notice: Subject to any disclaimer, the term of this patent is extended or adjusted under 35 U.S.C. 154(b) by 155 days.

(21) Appl. No.: 18/118,172

(22) Filed: Mar. 7, 2023

(65) Prior Publication Data

US 2023/0312985 A1 Oct. 5, 2023

(30) Foreign Application Priority Data

Mar. 14, 2022 (JP) .................. 2022-038825

(51) Int. Cl.
*C09J 7/29* (2018.01)
*C09J 7/20* (2018.01)

(52) U.S. Cl.
CPC .................. *C09J 7/29* (2018.01); *C09J 7/203* (2018.01); *C09J 2301/16* (2020.08); *C09J 2301/312* (2020.08)

(58) Field of Classification Search
CPC . C09J 7/29; C09J 7/203; C09J 2301/16; C09J 2301/312; C09J 2301/41; C09J 2433/00; C09J 2475/00; C09J 7/201; C09J 7/30; C09J 2301/122; C09J 2301/408; C08K 2201/01

See application file for complete search history.

(56) References Cited

U.S. PATENT DOCUMENTS

| 2007/0224380 A1* | 9/2007 | Ebisu | B32B 33/00 428/40.1 |
| 2013/0130026 A1* | 5/2013 | Heikkila | C08K 9/04 428/343 |
| 2022/0285089 A1* | 9/2022 | Omiya | H01F 1/28 |

FOREIGN PATENT DOCUMENTS

| JP | 2004031578 A | 1/2004 |
| JP | 2007070561 A | 3/2007 |
| JP | 2012219199 A | 11/2012 |
| JP | 2019218420 A | 12/2019 |

* cited by examiner

Primary Examiner — Patricia L. Nordmeyer
(74) Attorney, Agent, or Firm — Holtz, Holtz & Volek PC

(57) ABSTRACT

An adhesive tape has a noise reduction function. The adhesive tape comprises a main member having a front surface and a back surface, and an adhesive layer provided on the back surface of the main member. The main member comprises a magnetic sheet and a uniaxially oriented film laminated on the magnetic sheet. The magnetic sheet contains a binder and magnetic particles distributed in the binder. The magnetic sheet solely has breaking strength of 2.5 N/5 mm or more but 40 N/5 mm or less, and elongation at break of 25% or less.

9 Claims, 4 Drawing Sheets

ADHESIVE TAPE AND TAPE ROLL

CROSS REFERENCE TO RELATED APPLICATIONS

This application is based on and claims priority under 35 U.S.C. § 119 to Japanese Patent Application No. JP 2022-038825 filed Mar. 14, 2022, the content of which is incorporated herein in its entirety by reference.

BACKGROUND OF THE INVENTION

This invention relates to an adhesive tape and a tape roll each having a noise reduction function.

For example, a magnetic sheet having a noise reduction function is disclosed in JP 2004-031578 A (Patent Document 1), the content of which is incorporated herein by reference.

Patent Document 1 discloses a magnetic sheet formed of a base, a magnetic layer and an adhesive layer which are laminated together. The base is made of a film material which has brittleness lower than that of the magnetic layer and can provide moderate resiliency to the magnetic layer. This base prevents the magnetic sheet from being broken or torn off when the magnetic sheet is stuck on an object.

For example, there is a request to form an adhesive tape from a magnetic sheet having a noise reduction function and to wind the adhesive tape around a cable. There is another request to stick the magnetic sheet on an object in a workplace in order to easily check its noise reduction function as necessary.

SUMMARY OF THE INVENTION

It is therefore an object of the present invention to provide an adhesive tape which has a noise reduction function, and which can improve workability in a workplace. It is another object of the present invention to provide a tape roll formed of this adhesive tape.

The use of a cutting tool such as scissors is prohibited in some workplaces where an adhesive tape is used. Moreover, it is desirable that an adhesive tape can be easily and linearly cut by hand without using a cutting tool in a workplace so that workability in the workplace is improved. As a solution of this problem, the inventors of the present invention have conceived and experimentally made an adhesive tape formed of a uniaxially oriented film and a magnetic sheet laminated together. However, there was a problem about this adhesive tape that the magnetic sheet did not follow a TD-cut, or a cut in a transverse direction, of the uniaxially oriented film.

The magnetic sheet is formed of magnetic particles and a binder which binds the magnetic particles together. The thus-formed magnetic sheet should have some amount of strength so that its sheet-like shape is maintained. Moreover, there is a trade-off relation between improvement of magnetic properties of the magnetic sheet and decrease in physical strength of the magnetic sheet. Therefore, decrease in physical strength of the magnetic sheet is generally considered to be unpreferable. However, according to the present invention, since the magnetic sheet is supported by the uniaxially oriented film, the magnetic sheet itself does not need to have strength for maintaining its sheet-like shape. It was also found that even if the physical strength of the magnetic sheet was reduced to some extent, the degradation of magnetic properties was maintained within a practically acceptable range.

The present invention has been made based on the consideration described above. More specifically, the present invention provides the adhesive tape described below.

An aspect of the present invention provides an adhesive tape having a noise reduction function. The adhesive tape comprises a main member having a front surface and a back surface, and an adhesive layer provided on the back surface of the main member. The main member comprises a magnetic sheet and a uniaxially oriented film laminated on the magnetic sheet. The magnetic sheet contains a binder and magnetic particles distributed in the binder. The magnetic sheet solely has breaking strength of 2.5 N/5 mm or more but 40 N/5 mm or less, and elongation at break of 25% or less.

According to the adhesive tape of an aspect of the present invention, the magnetic sheet is designed to have breaking strength within a proper range. As a result, the adhesive tape can be easily and linearly TD-cut because of properties of the uniaxially oriented film with no degradation of magnetic properties that might cause practical problem. Thus, an aspect of the present invention provides an adhesive tape which has a noise reduction function, and which can improve workability in a workplace. An aspect of the present invention also provides a tape roll formed of this adhesive tape.

An appreciation of the objectives of the present invention and a more complete understanding of its structure may be had by studying the following description of the preferred embodiment and by referring to the accompanying drawings.

Figure 1:
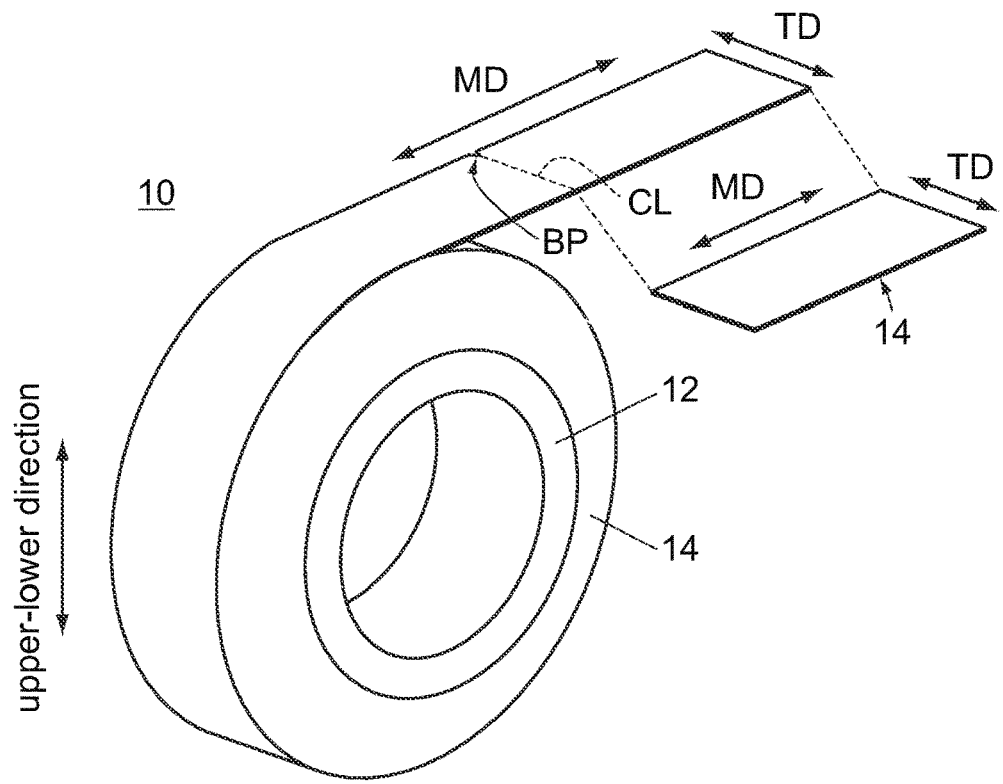
FIG. 1 is a perspective view showing a tape roll according to an embodiment of the present invention, wherein an adhesive tape which is cut off from the tape roll is illustrated in addition to the adhesive tape wounded around a winding core of the tape roll.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring to FIG. 1, a tape roll 10 according to an embodiment of the present invention comprises a winding core 12 and an adhesive tape 14 having a noise reduction function. The adhesive tape 14 is wound around the winding core 12. Thus, the tape roll 10 is a tape roll comprising the adhesive tape 14, wherein the adhesive tape 14 is wound in a roll. The adhesive tape 14 of the present embodiment is relatively small. For example, the illustrated adhesive tape 14 has a size in a transverse direction (TD) of about 19 mm and has a thickness of about 150 μm. The tape roll 10 has a size small enough to be fit in a palm and is easy to carry around. The tape roll 10 of the present embodiment has the aforementioned structure. However, the structure of the tape roll 10 is not specifically limited, provided that the tape roll 10 comprises the adhesive tape 14. For example, the winding core 12 may be provided as necessary.

The adhesive tape 14 is adhesive enough to maintain its roll shape when the tape roll 10 is carried around. Moreover, the adhesive tape 14 can be dawn out from the tape roll 10 along a machine direction (MD) perpendicular to the transverse direction (TD). By merely applying a force to a breaking point BP which is a part of the adhesive tape 14 drawn out along the machine direction, the adhesive tape 14 can be easily cut in the transverse direction without using a cutting tool such as scissors as if it is torn off. In the explanation described below, the aforementioned cut is referred to "TD-cut". The adhesive tape 14 can be linearly cut along a cutting line CL extending in the transverse direction by the TD-cut. As described above, the adhesive tape 14 of the present embodiment can be easily TD-cut into a required length as necessary. For example, the adhesive tape 14 which is TD-cut can be wound around a cable (not shown) of a harness (not shown), and thereby electro-magnetic noise can be reduced.

Hereafter, explanation will be made about the adhesive tape 14 of the present embodiment. The words such as "horizontal plane", "upper" and "lower" which indicate positional relations in the explanation described below do not show an absolute position relative to the ground but merely show a relative position in the figures.

Figure 3:
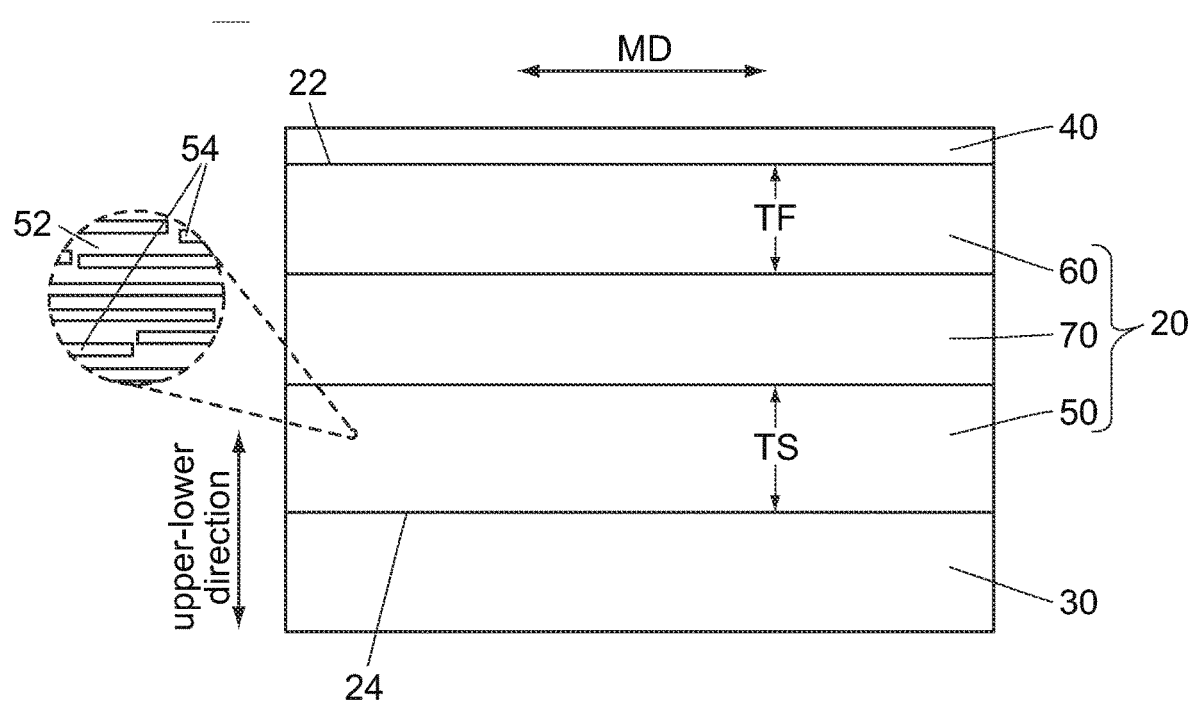
FIG. 3 is a side view schematically showing a layer structure of the adhesive tape of FIG. 2, wherein a part of a magnetic sheet enclosed by dashed line is enlarged, and an inner structure of the magnetic sheet is schematically illustrated in the enlarged view.

Referring to FIG. 3, the adhesive tape 14 of the present embodiment comprises a main member 20 having a front surface 22 and a back surface 24, an adhesive layer 30 provided on the back surface 24 of the main member 20 and a release layer 40 provided on the front surface 22 of the main member 20. The main member 20 is a member responsible for the noise reduction function of the adhesive tape 14. The adhesive layer 30 is a member responsible for adhesion of the adhesive tape 14 and is made of a typical adhesive such as an acrylic adhesive and an ester adhesive. The adhesive layer 30 is used not only for maintaining the roll shape of the adhesive tape 14 but also for adhering the adhesive tape 14 on a part which generates electro-magnetic noise. The release layer 40 is a member which enables the adhesive tape 14 to be easily drawn out from the tape roll 10 (see FIG. 1) and made of a typical release agent such as a silicone release agent.

As can be seen from the explanation described above, when the adhesive tape 14 can be drawn out from the tape roll 10 (see FIG. 1) without providing the release layer 40, the release layer 40 does not need to be provided. Moreover, when the adhesive tape 14 having a sheet-like shape is used without forming the tape roll 10, the release layer 40 does not need to be provided. Thus, the release layer 40 may be provided as necessary. In other words, the adhesive tape 14 may comprise only the main member 20 and the adhesive layer 30. Instead, the adhesive tape 14 may further comprise another layer in addition to the aforementioned layers.

The main member 20 of the present embodiment comprises a magnetic sheet 50 having soft magnetism, a uniaxially oriented film 60 and an adhesion layer 70. The magnetic sheet 50, the uniaxially oriented film 60 and the adhesion layer 70 are layered in an upper-lower direction perpendicular to both the machine direction (MD) and the transverse direction (TD). The adhesion layer 70 of the present embodiment is made of a typical adhesive such as an adhesive for dry lamination and an anchor coating agent. For example, the adhesion layer 70 may be a double-sided tape which includes a polyethylene terephthalate (PET) based film having a thickness of 4 μm or less and which can be easily broken.

The magnetic sheet 50 and the uniaxially oriented film 60 of the present embodiment are indirectly adhered to each other via the adhesion layer 70. However, the present invention is not limited thereto. For example, the magnetic sheet 50 may be impregnated with a liquid adhesive and may be directly adhered to the uniaxially oriented film 60. In this instance, the visible adhesion layer 70 does not need to be provided. In other words, the adhesion layer 70 may be provided as necessary, and the main member 20 may comprise only the magnetic sheet 50 and the uniaxially oriented film 60. Instead, the main member 20 may further comprise another layer in addition to the aforementioned layers.

The uniaxially oriented film 60 of the present embodiment is in contact with the release layer 40. Thus, the uniaxially oriented film 60 has a surface which forms the front surface 22 of the main member 20. More specifically, the front surface 22 of the main member 20 is an upper surface of the uniaxially oriented film 60. Moreover, the magnetic sheet 50 of the present embodiment is in contact with the adhesive layer 30. Thus, the magnetic sheet 50 has a surface which forms the back surface 24 of the main member 20. More specifically, the back surface 24 of the main member 20 is a lower surface of the magnetic sheet 50.

As described above, the uniaxially oriented film 60 of the present embodiment is placed over the magnetic sheet 50. However, the present invention is not limited thereto, but the uniaxially oriented film 60 may be placed under the magnetic sheet 50. In other words, the uniaxially oriented film 60 may have a surface which forms the back surface 24 of the main member 20, and the magnetic sheet 50 may have a surface which forms the front surface 22 of the main member 20. Thus, the main member 20 may comprise the magnetic sheet 50 and the uniaxially oriented film 60 which is directly or indirectly laminated on the magnetic sheet 50.

The magnetic sheet 50 of the present embodiment contains a binder 52 and magnetic particles 54 distributed in the binder 52.

The magnetic particles 54 of the present embodiment are soft magnetic metal particles each having a flat shape. For example, the magnetic sheet 50 having a flat-plate shape can be made as described below. First, the magnetic particles 54 are mixed with a solvent, a viscosity improver and the binder 52 so that they form slurry. Then, the slurry is applied on a board. Then, the applied slurry is heated so that the solvent is volatized, and thereby a sheet-like preliminary body is made. Then, sheets each having a required shape are punched out from the preliminary body. A necessary number of the thus-obtained sheets are vertically stacked and pressed so that the magnetic sheet 50 is made. For example, the magnetic sheet 50 used for the tape roll 10 (see FIG. 1) can be made in a process in which a sheet-like long preliminary body is made, and then the unstacked preliminary body is wound in a roll while being pressed. In any of the magnetic sheets 50, the magnetic particles 54 extend roughly in parallel to a horizontal plane defined by the transverse direction (TD) and the machine direction (MD).

The magnetic sheet 50 of the present embodiment is formed of the aforementioned flat soft magnetic metal particles and the binder 52. However, the present invention is not limited thereto, but material and manufacturing method of the magnetic sheet 50 are not specifically limited. For example, the magnetic particles 54 may be sphere-like soft magnetic metal particles.

The uniaxially oriented film 60 of the present embodiment is made of polymers such as polyethylene or polypropylene. The uniaxially oriented film 60 is formed of chains of filamentous polymer which are stretched in the transverse direction (TD) and is easily TD-cut. In contrast, the magnetic sheet 50 of the present embodiment has a substantially uniform structure in the horizontal plane. For example, the magnetic sheet 50 has breaking strength, or tensile strength at a time when the magnetic sheet 50 is broken, in the machine direction (MD) which is substantially same as breaking strength of the magnetic sheet 50 in the transverse direction. Thus, the magnetic sheet 50 is similarly broken by a similar force in any direction. Moreover, each of the adhesive layer 30, the release layer 40 and the adhesion layer 70 includes no base material or includes only an extremely thin base material and is thereby easily broken by any force in any direction.

Figure 2:
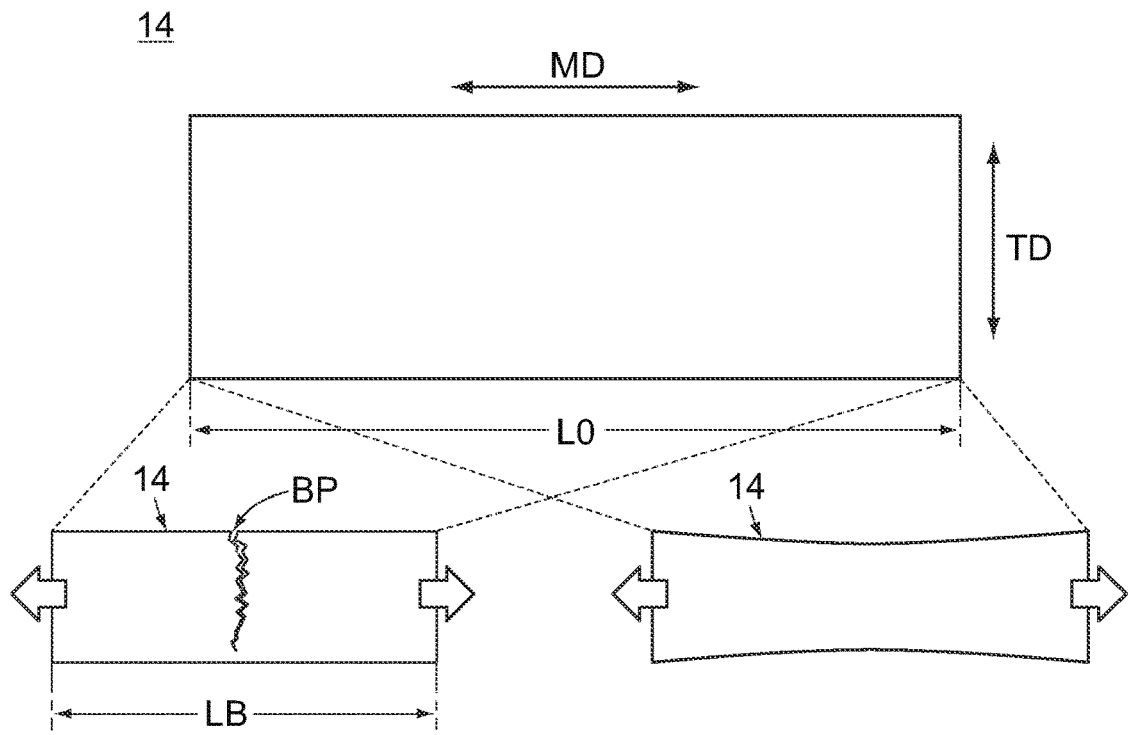
FIG. 2 is a plan view showing the adhesive tape of FIG. 1, wherein the adhesive tape which receives a tensile force in a machine direction (MD) is illustrated in lower right corner in this figure, and the adhesive tape which is broken because of this tensile force is illustrated in lower left corner in this figure.

Referring to FIG. 2 together with FIG. 3, the adhesive tape 14 is formed of the aforementioned layers described above and can be broken by a tensile force in the machine direction (MD) when the breaking strength and the elongation at break of the magnetic sheet 50 are properly designed. In detail, when the adhesive tape 14 receives a tensile force in the machine direction, the adhesive tape 14 is stretched in the machine direction to some extent and is then broken along the transverse direction (TD) (see the adhesive tape 14 illustrated in a lower left corner of FIG. 2). The adhesive tape 14 has a first length in a stretching direction which is the machine direction or the transverse direction when the tensile force is not applied and has a second length in the stretching direction when the adhesive tape 14 is broken because of the applied tensile force. For example, the first length is a length L0 in the machine direction in FIG. 2, and the second length is another length LB in the machine direction in FIG. 2. The elongation at break of the present embodiment is defined as a ratio of the second length relative to the first length. The adhesive tape 14 is stretched and broken as described below depending on the thus-defined elongation at break.

In an instance where the elongation at break, for example, LB/L0−1, is large, when the adhesive tape 14 receives a tensile force in the machine direction (MD), the adhesive tape 14 is largely stretched in the machine direction (see the adhesive tape 14 illustrated in lower right corner of FIG. 2). In this instance, even when the tensile force of the adhesive tape 14 is continuously made larger, the adhesive tape 14 is continuously stretched in the machine direction and is hardly broken before a timing when the tensile force is equal to the breaking strength. When the adhesive tape 14 is broken, a cutting part including the breaking point BP is largely deformed. Thus, linear TD-cut is difficult. In another instance where the elongation at break is small, when the adhesive tape 14 receives a tensile force in the machine direction, the adhesive tape 14 is stretched in the machine direction to some extent and is then broken along the transverse direction (TD). In this instance, since the elongation at break is small, the cutting part is hardly deformed and the adhesive tape 14 can be easily TD-cut.

The adhesive tape 14 having the aforementioned properties is invented based on the consideration described below.

The use of a cutting tool such as scissors is prohibited in some workplaces where the adhesive tape 14 is used. Moreover, it is desirable that the adhesive tape 14 can be easily and linearly cut (TD-cut) by hand without using a cutting tool in a workplace so that workability in the workplace is improved. However, in an instance where the breaking strength of the magnetic sheet 50 is high, the magnetic sheet 50 does not follow the TD-cut of the uniaxially oriented film 60, and thereby the adhesive tape 14 is hardly TD-cut. For example, when the adhesive tape 14 is cut, a rough edge tends to be generated, and the adhesive tape 14 cannot be cleanly cut.

As previously described, the magnetic sheet 50 of the present embodiment is formed of the magnetic particles 54 and the binder 52 which binds the magnetic particles 54 together. The thus-formed magnetic sheet 50 is required to have some amount of strength so that its sheet-like shape is maintained. Moreover, there is a trade-off relation between improvement of magnetic properties of the magnetic sheet 50 and decrease in physical strength of the magnetic sheet 50. Therefore, decrease in physical strength of the magnetic sheet 50 is generally considered to be unpreferable. However, according to the present embodiment, since the magnetic sheet 50 is supported by the uniaxially oriented film 60, the magnetic sheet 50 itself does not need to have strength for maintaining its sheet-like shape. In addition, according to an instance where occupancy of the magnetic particles 54 in the magnetic sheet 50, or a volume ratio of the magnetic particles 54 relative to the whole magnetic sheet 50, is kept to 30% or more, even when the breaking strength of the magnetic sheet 50 is reduced to some extent, degradation of magnetic properties is maintained within a practically acceptable range.

The adhesive tape 14 of the present embodiment is invented based on the aforementioned consideration. In detail, the uniaxially oriented film 60 solely has large elongation at break in each of the machine direction (MD) and the transverse direction (TD) and is hardly cut when merely stretched. In addition, since the uniaxially oriented film 60 is largely stretched in each of the machine direction and the transverse direction, the cutting part including the breaking point BP is largely deformed at a timing when the uniaxially oriented film 60 is broken. However, according to an instance where the magnetic sheet 50 having small elongation at break is stuck on the uniaxially oriented film 60, the elongation at break of the adhesive tape 14 can be made small and the breaking strength of the adhesive tape 14 can be kept to a relatively small value. In particular, the elongation at break of the adhesive tape 14 in the machine direction can be made extremely small. As a result, the magnetic sheet 50 follows the TD-cut of the uniaxially oriented film 60, and thereby the adhesive tape 14 is easily TD-cut.

According to the adhesive tape 14 of the present embodiment, the elongation at break of the adhesive tape 14 is reduced by setting the breaking strength of the magnetic sheet 50 within a proper range. More specifically, the magnetic sheet 50 of the present embodiment solely has breaking strength of 2.5 N/5 mm or more but 40 N/5 mm or less, and elongation at break of 25% or less. According to these properties, the adhesive tape 14 can be easily TD-cut because of properties of the uniaxially oriented film 60 with no degradation of the magnetic properties that might cause practical problems. Thus, the present embodiment provides the adhesive tape 14 which has a noise reduction function, and which can improve workability in a workplace. The present embodiment also provides the tape roll 10 (see FIG. 1) formed of the adhesive tape 14.

When the occupancy of the magnetic particles 54 is more that 50%, the volume ratio of the binder 52 in the magnetic sheet 50 becomes relatively low. As a result, the magnetic sheet 50 becomes brittle and impractical. When the occupancy of the magnetic particles 54 is less than 30%, the volume ratio of the binder 52 becomes relatively high. As a result, the elongation at break is made large and the magnetic sheet 50 is hardly TD-cut. In addition, the noise reduction function is degraded. Therefore, the occupancy of the magnetic particles 54 in the magnetic sheet 50 of the present embodiment is preferred to be 30% or more but 50% or less.

The binder 52 in the magnetic sheet 50 of the present embodiment includes at least one of acrylic rubber, acrylonitrile butadiene rubber and polyurethane resin.

More specifically, the binder 52 in the magnetic sheet 50 of the present embodiment includes a first resin made of acrylic rubber and a second resin made of acrylonitrile butadiene rubber. The first resin is suitable for improving the magnetic properties of the magnetic sheet 50 but is hard, and thereby the first resin is hardly broken. The second resin is soft and is easily broken but is unsuitable for improving the magnetic properties of the magnetic sheet 50. By mixing the second resin to the first resin, the magnetic sheet 50 can be made under a smaller pressure, in a shorter time and in a lower temperature. In addition, the adhesive tape 14 can be more easily TD-cut by a small force.

In the present embodiment, a volume ratio of the first resin relative to the second resin, or a volume of the first resin divided by another volume of the second resin, is 0.5 or more but 2.0 or less. According to the first resin and the second resin which meet this condition, the occupancy of the magnetic particles 54 in the magnetic sheet 50 can be easily made 30% or more.

Each of the adhesive layer 30, the release layer 40, the magnetic sheet 50, the uniaxially oriented film 60 and the adhesion layer 70 of the present embodiment has a thickness which is substantially constant regardless of positions in the horizontal plane. In particular, the uniaxially oriented film 60 has a first thickness TF, and the magnetic sheet 50 has a second thickness TS. When the first thickness TF is larger than a predetermined upper limit relative to the second thickness TS, the adhesive tape 14 is hardly TD-cut. When the first thickness TF is smaller than a predetermined lower limit relative to the second thickness TS, the magnetic sheet 50 can hardly maintain its sheet-like shape. According to the present embodiment, the aforementioned upper limit is 0.72, and the aforementioned lower limit is 0.06. Thus, in the present embodiment, it is preferable that a ratio of the first thickness TF relative to the second thickness TS is 0.06 or more but 0.72 or less, and it is further preferable that this ratio is 0.09 or more but 0.36 or less.

When the second thickness TS of the magnetic sheet 50 is smaller than 25 μm, the elongation at break of the adhesive tape 14 in the machine direction (MD) is largely affected by the uniaxially oriented film 60 and is made large. As a result, when the adhesive tape 14 is cut by hand without using scissors, the cutting part is largely deformed. When the second thickness TS is larger than 300 μm, the elongation at break in the transverse direction (TD) is made small, and the feature that the magnetic sheet 50 can be easily cut only in the transverse direction is lost. In addition, since the breaking strength in the transverse direction is made large, the magnetic sheet 50 hardly follows the TD-cut of the uniaxially oriented film 60 in the transverse direction. Therefore, in the present embodiment, it is preferable that the second thickness TS is 25 μm or more but 300 μm or less. Moreover, according to an instance where the second thickness TS is large, gaps or wrinkles tend to be formed when the adhesive tape 14 is wound to form the tape roll 10 (see FIG. 1). Therefore, it is more preferable that the second thickness TS, or the thickness of the magnetic sheet 50, is 200 μm or less.

Examples

Tapes were formed of a uniaxially oriented film and a magnetic sheet, and a breaking test was performed to these tapes. Hereafter, more detailed explanation about the present invention will be made with reference to the result of the breaking test.

(Breaking Test of Magnetic Sheets)

Figure 4:
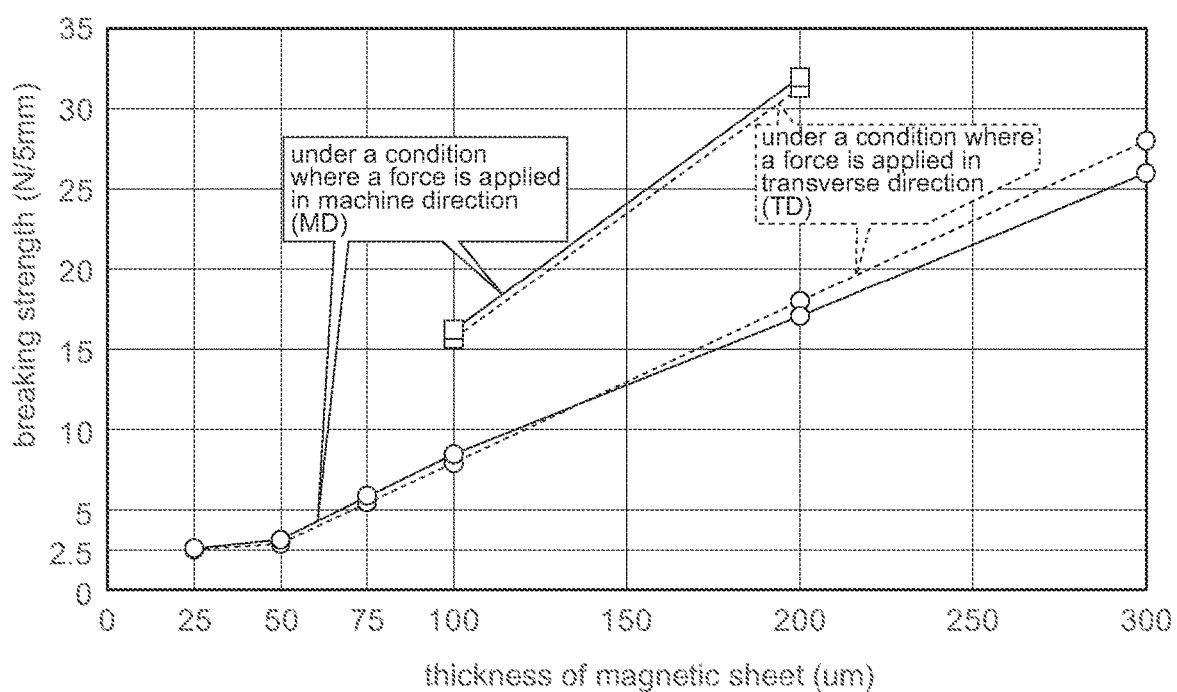
FIG. 4 is a view showing breaking strength of Examples of the magnetic sheets.
Figure 5:
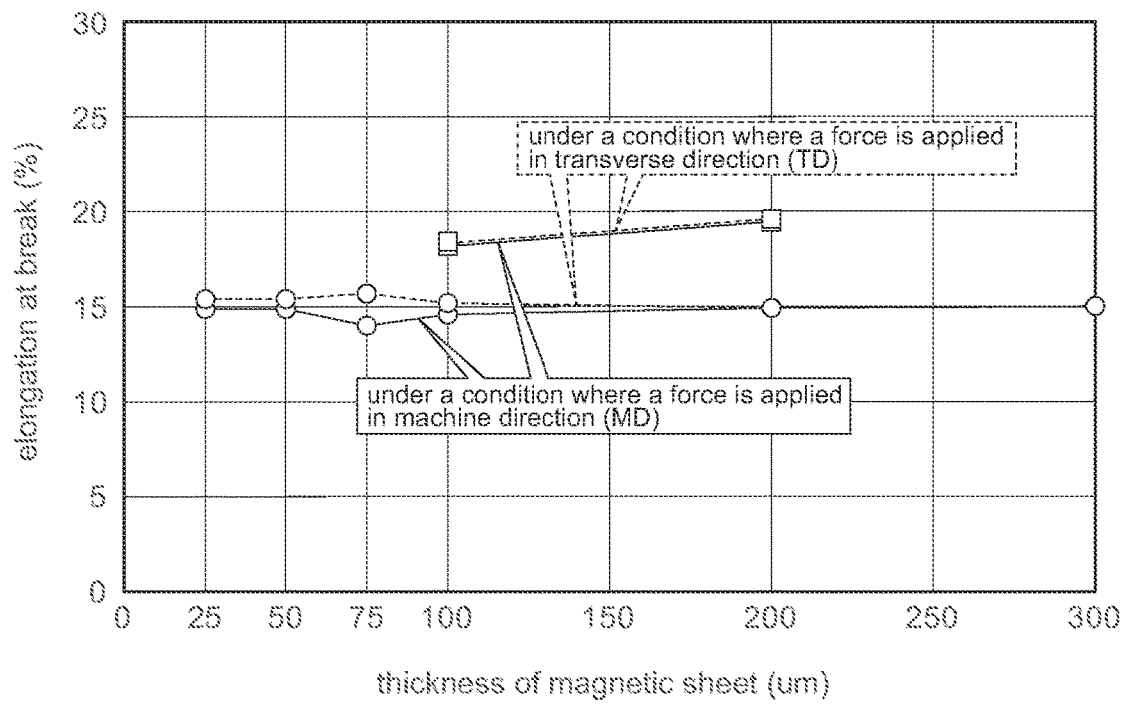
FIG. 5 is a view showing elongation at break of Examples of the magnetic sheets.

Magnetic sheets having various thicknesses were made, and a breaking test was performed to these magnetic sheets. In detail, first magnetic sheets having various thicknesses and second magnetic sheets having various thicknesses were made. Each of the first magnetic sheets included a binder formed of acrylic rubber and acrylonitrile-butadiene rubber. Each of the second magnetic sheets included another binder formed of only acrylic rubber. Each of the magnetic sheets was stretched in each of the machine direction (MD) and the transverse direction (TD) so that breaking strength, i.e., a force which was applied when the magnetic sheet was broken, and elongation at break were measured. FIGS. 4 and 5 show measurement results of Examples of the first magnetic sheets, or Examples having thicknesses of 25 μm, 50 μm, 75 μm, 100 μm, 200 μm and 300 μm, respectively (see circular plots in FIGS. 4 and 5). FIGS. 4 and 5 also show measurement results of Examples of the second magnetic sheets, or Examples having thicknesses of 100 μm and 200 μm, respectively (see rectangular plots in FIGS. 4 and 5).

As shown in FIGS. 4 and 5, when the magnetic sheet has a thickness of 25 μm or more but 300 μm or less, the breaking strength of the magnetic sheet is 2.5 N/5 mm or more but 40 N/5 mm or less, and the elongation at break of the magnetic sheet is 25% or less.

(Breaking Test of Uniaxially Oriented Film)

A commercially available caralyan-Y made of high-density polyethylene was used so that the uniaxially oriented film was prepared. The prepared uniaxially oriented film had a thickness of 18 μm. When a uniform force was applied to the uniaxially oriented film in the machine direction (MD), the uniaxially oriented film was largely stretched in the machine direction (see Example of the magnetic sheet having a thickness of 0 μm in FIG. 7). When the force in the machine direction (MD) was made large, the uniaxially oriented film was stretched by 70% and is then broken. The cut end which was formed when the uniaxially oriented film was broken was largely deformed. The uniaxially oriented film had large elongation at break of 70% in the machine direction but had small breaking strength under a condition where a uniform force was applied in the machine direction (see Example of the magnetic sheet having a thickness of 0 μm in FIG. 6). Accordingly, although the uniaxially oriented film could be easily cut in the transverse direction (TD) by applying a tearing force by hand without using a cutting tool such as scissors, the uniaxially oriented film could not be cleanly cut because of the deformation in the cut end.

(Breaking Test of Tapes)

Figure 6:
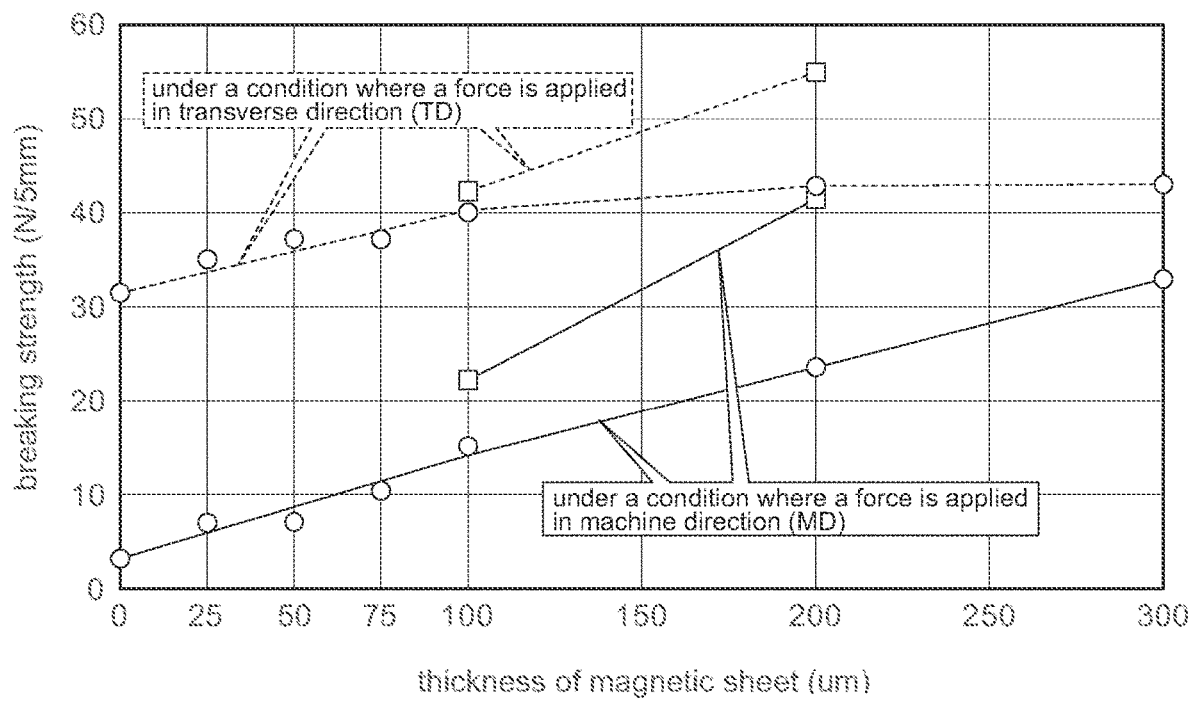
FIG. 6 is a view showing breaking strength of Examples of the adhesive tapes.
Figure 7:
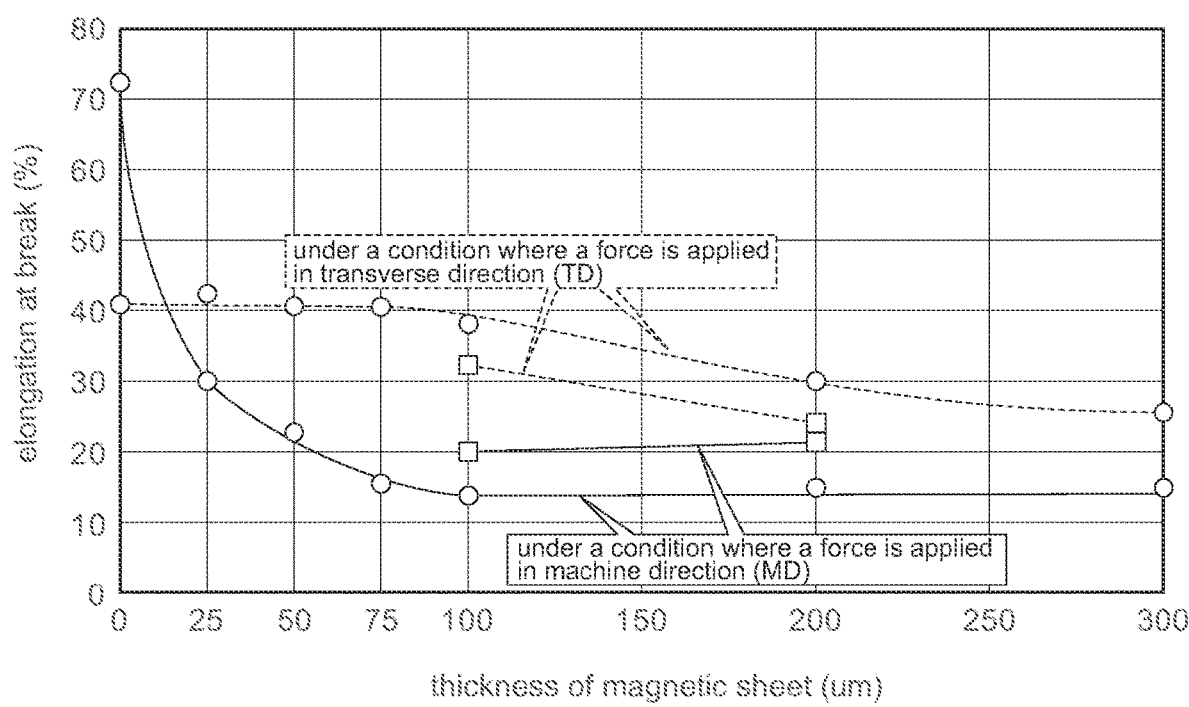
FIG. 7 is a view showing elongation at break of Examples of the adhesive tapes.

The aforementioned uniaxially oriented film was covered by and adhered to each of the magnetic sheets which included the first magnetic sheets and the second magnetic sheets and had various thicknesses so that tapes having various thicknesses were made. The breaking test was performed to the thus-made tapes. More specifically, each of the tapes is stretched in each of the machine direction (MD) and the transverse direction (TD) so that breaking strength and elongation at break were measured. FIGS. 6 and 7 show measurement results of the tapes including Examples of the first magnetic sheets having thicknesses of 25 μm, 50 μm, 75 μm, 100 μm, 200 μm and 300 μm, respectively (see circular plots in FIGS. 6 and 7). FIGS. 6 and 7 also show measurement results of the tapes including Examples of the second magnetic sheets having thicknesses of 100 μm and 200 μm, respectively (see rectangular plots in FIGS. 6 and 7).

In an instance where the magnetic sheet has a thickness of 25 μm or more but 300 μm or less, a ratio of a thickness of the uniaxially oriented film relative to another thickness of the magnetic sheet is 0.06 or more but 0.72 or less. As shown in FIGS. 6 and 7, each Example of the tape has the breaking strength of 60 N/5 mm or less, and the elongation at break of 42% or less. In particular, when the tape is stretched in the machine direction (MD), the breaking strength is 42 N/5 mm or less, and the elongation at break is 30% or less. Examples of the tapes which met the aforementioned conditions could be easily and linearly cut (TD-cut) in the transverse direction (TD) by applying a tearing force by hand without using a cutting tool such as scissors.

In contrast, each of the tapes comprising the magnetic sheet of a thickness of less than 25 μm could not be cleanly cut. For example, the cut end which was formed when the tape was broken was largely deformed. Each of the tapes comprising the magnetic sheet of a thickness of more than 300 μm could be easily cut, but the magnetic sheet did not follow the TD-cut of the uniaxially oriented film and could not be cleanly cut. For example, burrs were produced when the tape was cut.

According to the experiment results describe above, it is can be understood that the tape which is easily TD-cut is obtained when the ratio of the thickness of the uniaxially oriented film relative to the thickness of the magnetic sheet is 0.06 or more but 0.72 or less.

While there has been described what is believed to be the preferred embodiment of the invention, those skilled in the art will recognize that other and further modifications may be made thereto without departing from the spirit of the invention, and it is intended to claim all such embodiments that fall within the true scope of the invention.

What is claimed is:

1. An adhesive tape having a noise reduction function, wherein:
    the adhesive tape comprises a main member having a front surface and a back surface, and an adhesive layer provided on the back surface of the main member;
    the main member comprises a magnetic sheet and a uniaxially oriented film laminated on the magnetic sheet;
    the magnetic sheet contains a binder and magnetic particles distributed in the binder; and
    the magnetic sheet solely has breaking strength of 2.5 N/5 mm or more but 40 N/5 mm or less, and elongation at break of 25% or less.

2. The adhesive tape as recited in claim 1, wherein occupancy of the magnetic particles in the magnetic sheet is 30% or more but 50% or less.

3. The adhesive tape as recited in claim 1, wherein the binder contains at least one of acrylic rubber, acrylonitrile butadiene rubber and polyurethane resin.

4. The adhesive tape as recited in claim 1, wherein the binder contains a first resin made of acrylic rubber and a second resin made of acrylonitrile butadiene rubber, and a ratio of the first resin relative to the second resin is 0.5 or more but 2.0 or less.

5. The adhesive tape as recited in claim 1, wherein:
    the uniaxially oriented film has a first thickness;
    the magnetic sheet has a second thickness; and
    a ratio of the first thickness relative to the second thickness is 0.06 or more but 0.72 or less.

6. The adhesive tape as recited in claim 1, wherein the magnetic sheet has a thickness of 300 μm or less.

7. The adhesive tape as recited in claim 1, wherein the adhesive tape comprises a release layer provided on the front surface of the main member.

8. The adhesive tape as recited in claim 7, wherein:
    the uniaxially oriented film has a surface which forms the front surface of the main member; and
    the magnetic sheet has a surface which forms the back surface of the main member.

9. A tape roll comprising the adhesive tape as recited in claim 7, wherein the adhesive tape is wound in a roll.

\* \* \* \* \*